US005465387A

United States Patent [19]
Mukherjee

[11] Patent Number: 5,465,387
[45] Date of Patent: Nov. 7, 1995

[54] ADAPTIVE FRAUD MONITORING AND CONTROL

[75] Inventor: Arabinda Mukherjee, South Brunswick, N.J.

[73] Assignee: AT&T Corp., Murray Hill, N.J.

[21] Appl. No.: 134,358

[22] Filed: Oct. 8, 1993

[51] Int. Cl.⁶ .............................. H04M 1/19; H04L 9/32
[52] U.S. Cl. .............................. 455/26.1; 379/62; 380/23
[58] Field of Search .......................... 455/26.1; 379/62; 380/23

[56] References Cited

U.S. PATENT DOCUMENTS

| | | | |
|---|---|---|---|
| 4,694,492 | 9/1987 | Winstrom et al. | 380/23 |
| 4,719,566 | 1/1988 | Kelley. | |
| 4,748,668 | 5/1988 | Shamir et al.. | |
| 4,962,449 | 10/1990 | Schlesinger. | |
| 5,148,481 | 9/1992 | Abraham et al.. | |
| 5,153,918 | 10/1992 | Tusi. | |
| 5,278,904 | 1/1994 | Servi | 380/23 |
| 5,311,596 | 5/1994 | Scott et al. | 380/23 X |
| 5,365,587 | 11/1994 | Campbell et al. | 380/23 X |

Primary Examiner—Gilberto Barron, Jr.

[57] ABSTRACT

Access to a resource such as a telecommunications system is monitored and prevented adaptively on a real-time basis by establishing with the customer, a steady state low level of surveillance and arbitrary intermittent interruption during which the telecommunications company demands authentication, by personal identification number (PIN), of a given fraction of access demands (for example, telephone calls), and, in response to signals indicating that arrival of an alert condition, and preferably at least one prior invalid call, raising the level of authentication demands.

22 Claims, 5 Drawing Sheets

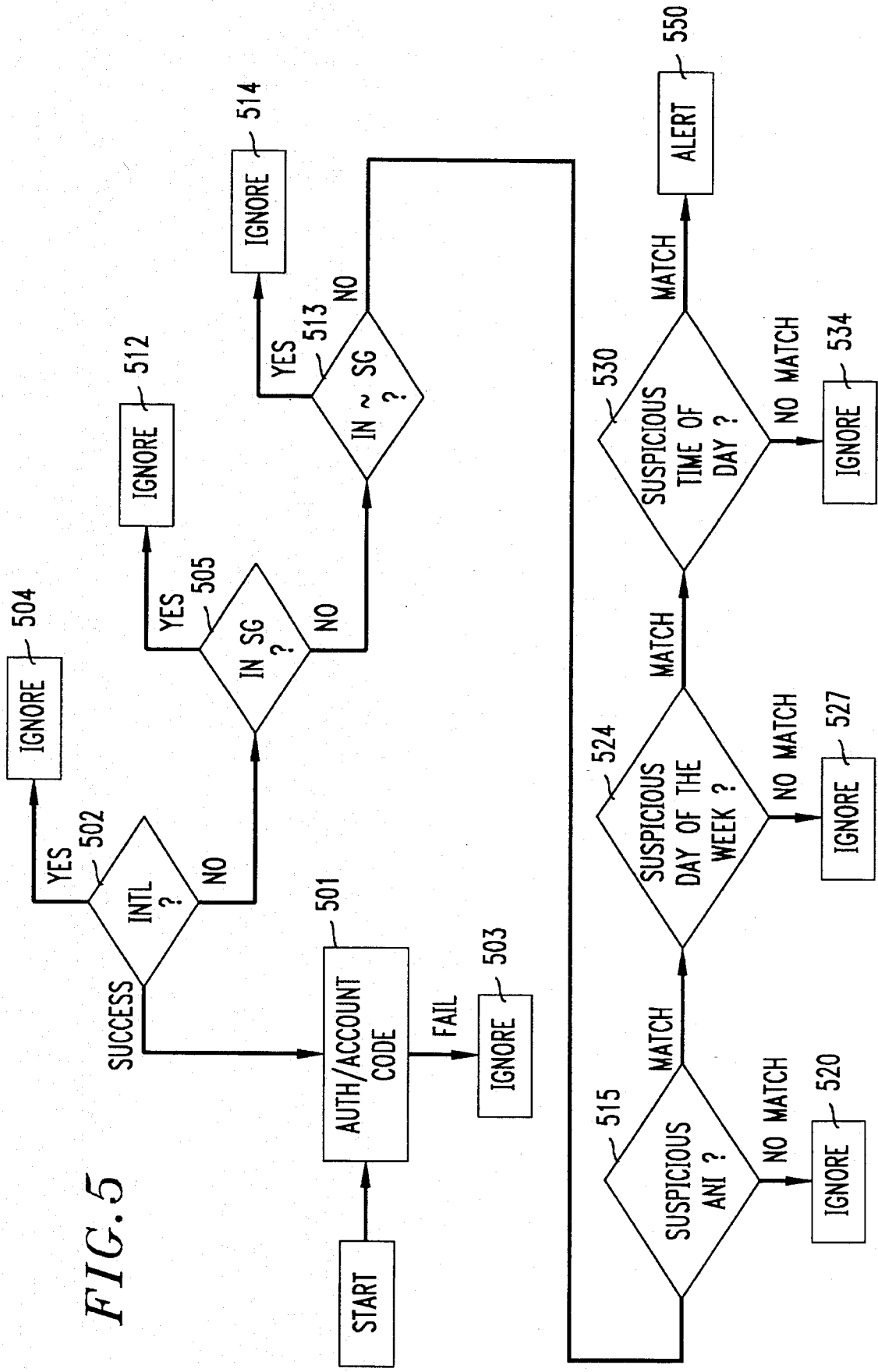

ADAPTIVE FRAUD MONITORING AND CONTROL

RELATED APPLICATIONS

This application is related to the co-pending application of B. E. McNair, Ser. No. 07/891,347 filed May 29, 1992, and assigned to the same assignee as the present invention.

FIELD OF THE INVENTION

This invention relates generally to methods and means for controlling access to a resource such as a telecommunications network, and particularly to an adaptive based fraud monitoring and control arrangement and method for telecommunications services.

BACKGROUND OF THE INVENTION

Unauthorized persons frequently gain fraudulent access to a telecommunications network and thus impose financial loss and other problems on the telecommunications company. International and local calling card fraud creates a significant level of discomfort both to the telecommunications provider as well as the legitimate customer. If the providing company allows a fraudulent call to go through, the customer complains about the billing. On the other hand, if the provider interrupts a suspicious call which turns out to be legitimate, the customer will also disapprove of the intrusion.

Prior systems have attempted to avoid such problems but have been too complex or rigid to operate in complicated telecommunication environments.

An object of the invention is to improve telecommunication fraud monitoring services.

Another object of the invention is to overcome the aforementioned difficulties.

SUMMARY OF THE INVENTION

According to a feature of the invention, these objects are attained, on the basis of customer agreement and information, by establishing a rate of interruption for demanding authentication from a potential accessor, such as a telephone caller, denying access in the event of failure to authenticate in response to each demand; and automatically varying the rate of interruption to a another rate in response to predetermined conditions.

More specifically the invention involves searching for suspicious access requests (for example, telephone calls), and demanding authentication from access requestors of a given fraction of the suspicious access requests and, in response to data concerning suspicious accesses, changing the fraction to a another value.

According to another feature of the invention, the suspicious nature of access requests are determined by the customer on the basis of an analysis of the customer's billing history.

According to another feature of the invention, the fraction of calls subject to authentication demands is automatically raised or lowered to values determined by the customer to values between 0 and 1.0.

Another feature of the invention involves determining the fraction on the basis of the rate of failed authentications of suspicious calls occurring during a selected period.

These and other features of the invention are pointed out in the claims. Other objects and advantages of the invention will become evident from the following detailed description when read in light of the accompanying drawings.

BRIEF DESCRIPTION OF THE DRAWINGS

FIG. 5 is another flow chart illustrating the logic for establishing an alert condition that indicates determination of whether the rate of authentication demands should change.

DETAILED DESCRIPTION OF PREFERRED EMBODIMENTS

Figure 1:
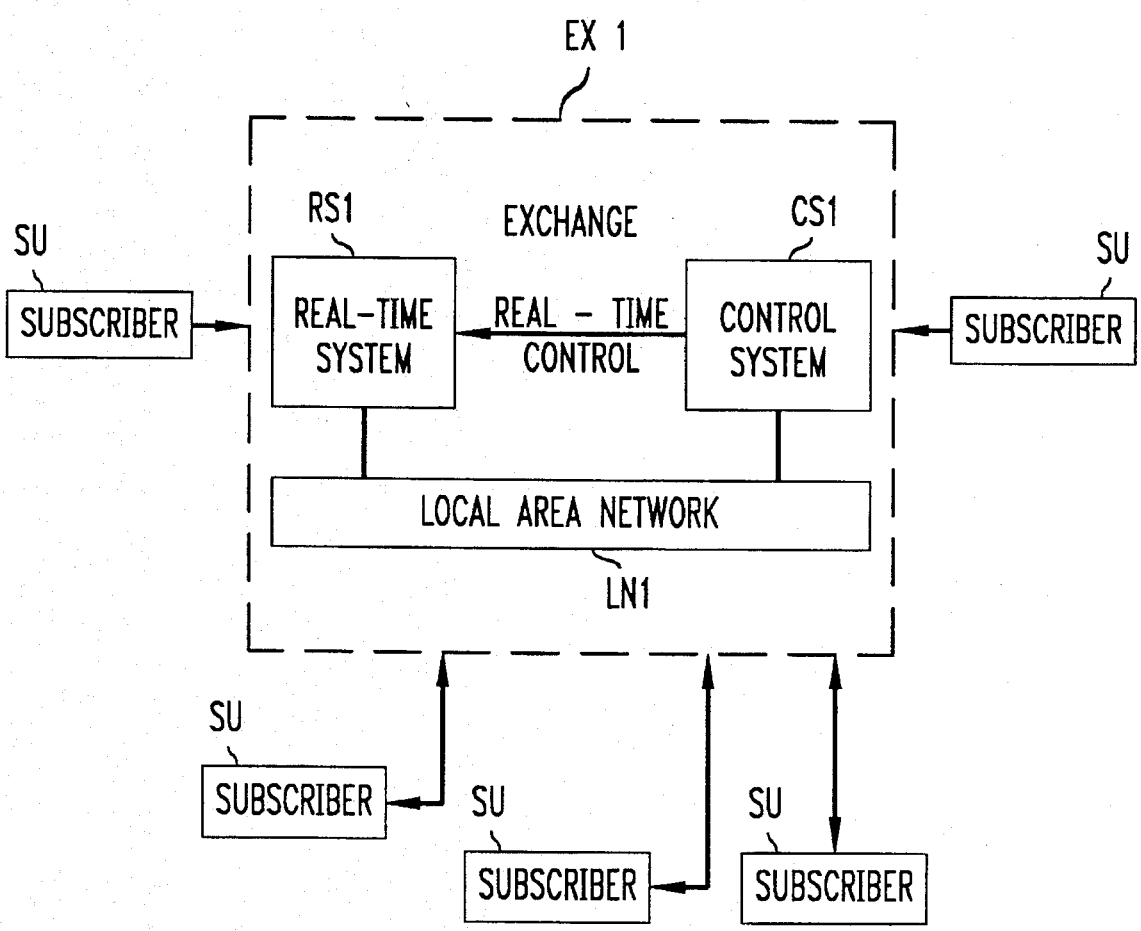
FIG. 1 is a block diagram of a telecommunication system embodying features of the invention.

FIG. 1 illustrates a telephone network embodying the invention. Here, an exchange EX1 of a communication provider includes a real-time system RS1 in the form of a processor, which functions under the control of a control system CS1 also in the form of a processor. Both the real-time system RS1 and the control system CS1 connect to a local area network LN1 to permit the control system CS1 to receive all messages to and from the real-time system RS1. The exchange EX1 communicates with a number of subscribers SU, which may be individual homes, PBX's, public telephones accepting credit card calls, mobile telephones in cellular networks, or software defined networks.

The real-time system RS1 responds to each call from a telephone set of a subscriber SU by determining whether the subscriber has given instructions to limit the calls from the subscriber's telephone set. If so, the real-time system RS1 conducts call processing operations. The steps of the call processing operation arise from information and authorization received from the particular subscriber whose telephone set is the source of the call. The processing of operations may involve a number of conditions, such as limits to international calls, or, in the case the subscriber has placed no conditions, be non-existent.

As part of the monitoring and control operation, the control system CS1 checks whether the subscriber SU making the call has an agreement with the service provider to carry out authentication operations. That is, the control system CS1, determines whether the call is arriving from a subscriber SU with which the provider has an agreement to conduct authentication of suspicious calls and to adapt the authentication to various fractions of the suspicious calls.

If such an agreement exists, the real-time system RS1 determines if the call falls into the category of suspicious calls and, at the appropriate point in the call processing operation, the real-time system RS1 performs an authentication operation on every 1/P-th suspicious call, where P is a fraction set by the subscriber agreement, and may for example be anywhere from 0 to 1.0. The control system CS1 adapts the value of P to other values depending upon the rate of failed authentication operations. For example, the control system CS may set the value of P to a low default value, (i.e. 1/P is set high,) for a low level of surveillance, and if the number of failed authentications exceeds a predetermined rate, the control system responds by setting the value P to an intermediate value for an intermediate degree of surveillance previously established by the subscriber. If the number of failed authentications still exceeds the predetermined rate, the control system CS1 sets P to a higher value (i.e. sets 1/P to a lower value) for a higher proportion of surveillance. The adapted values of P and the rate of failed authentications needed for change is determined by agreement with each subscriber SU.

Figure 2:
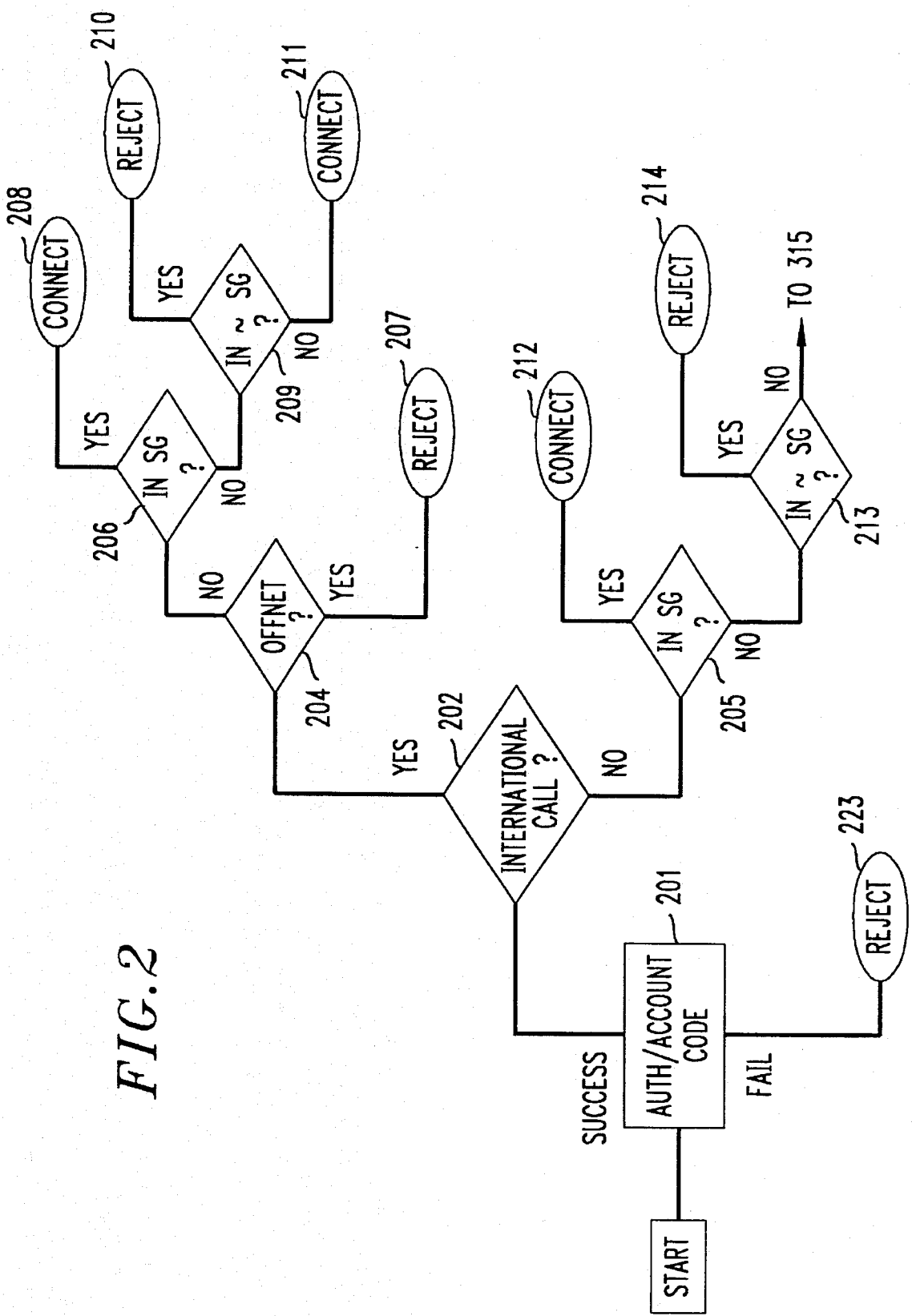
FIG. 2 is a tree chart showing monitoring operations incorporating features of the invention.
Figure 3:
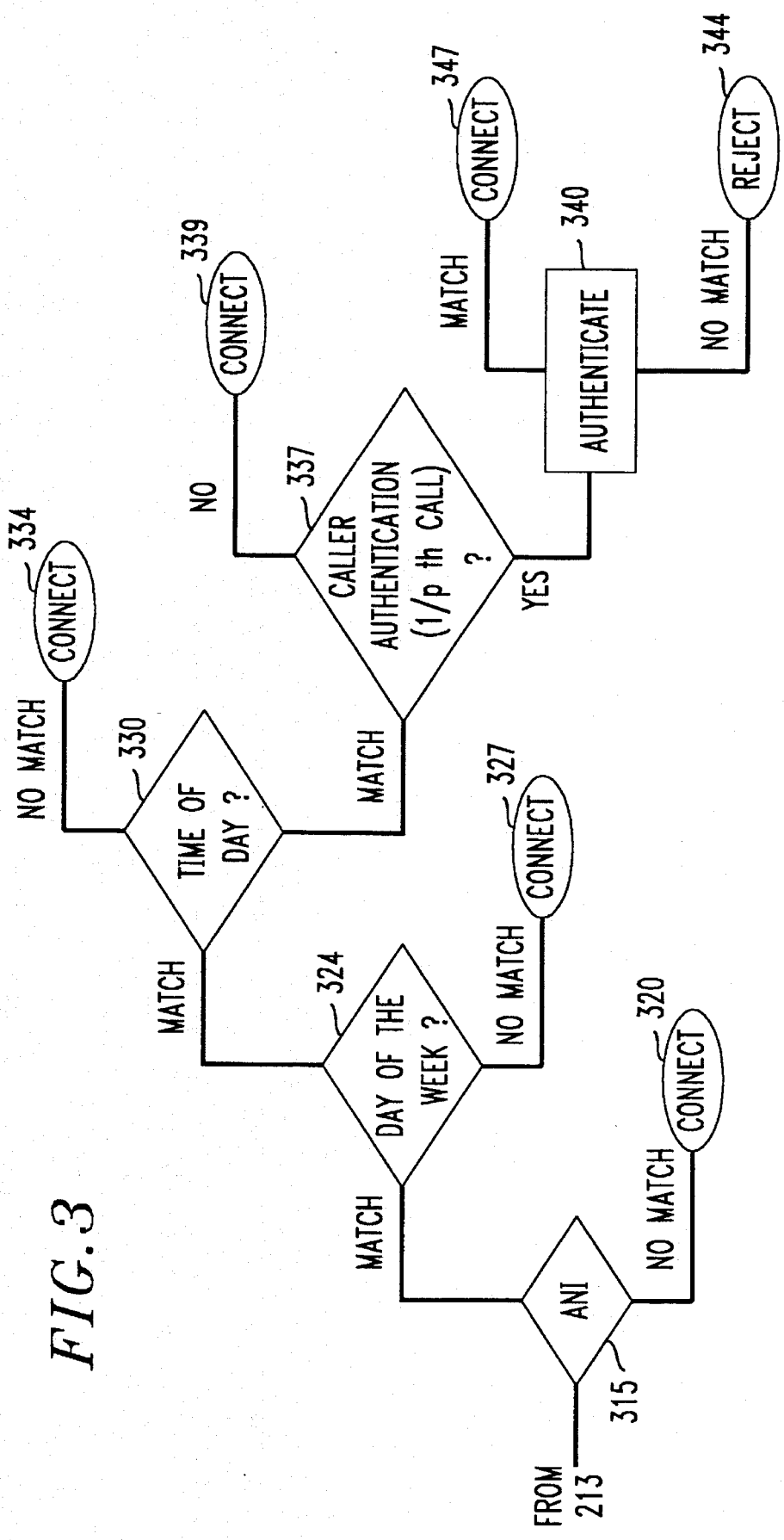
FIG. 3 is tree chart showing continuing the monitoring operations of FIG. 2.

FIGS. 2 and 3 illustrate the steps of the call processing operation in the real-time system RS1. The steps of FIG. 2 deal with fixed authorizations that the subscriber SU has placed on its telephones sets, credit cards, and other calling sources. The real-time system connects authorized calls and rejects others. The steps of FIG. 3 handle suspicious circumstances that give rise to the possibility but not the certainty that the call is fraudulent. The steps in FIG. 2 are examples of pre-conditions that a subscriber imposes on its callers. Different subscribers impose different conditions. The steps of FIG. 3 represent examples which serve the particular subscriber SU and depend upon the history of fraudulent calls experienced by the subscriber. Different subscribers will look for different conditions.

In step 201 of FIG. 2, the real-time system RS1 determines whether the caller's account and authorization codes are valid for the particular subscriber. These codes may be a combination of a telephone credit card number or a station number or a cellular phone code, etc. and a customer identification number. If the codes are invalid, the real-time system RS1 rejects the call in step 203.

If the codes are valid, the real-time system RS1 proceeds to step 202 to determine if this is an international call. If yes, step 204 determines if this international call is an off-net call, namely one prohibited by the subscriber. If yes, the real-time system RS1 rejects the call in step 207. If no, the real-time system RS1 in step 206 determines whether the caller is part of a specifically permitted screening group. If yes, the real-time system RS1 acts to have the system connect the call.

If the answer is no, step 209 determines whether it is in a specifically forbidden screening group. If the answer is no, step 211 also acts to connect the call. If the answer is yes, the real-time system RS1 in step 210 rejects the call.

If step 202 indicates that this is not an international call, the real-time system RS1 goes to step 205 and determines whether the caller is in a specifically permitted screening group. If yes, the real-time system RS1 goes to step 212 which connects the call. If the caller is not in the specifically permitted screening group, the process goes to step 213 to determine if the caller is in a specifically forbidden screening group. If yes, the real-time system RS1 goes to step 214 and rejects the call. If not the process continues as in FIG. 3 which is an extension of FIG. 2.

FIG. 3 deals with suspect conditions which help in determining whether the call should be authenticated. These conditions are only examples, and vary from subscriber to subscriber, and depend on the history of fraudulent calls that the subscriber has experienced. In FIG. 3, step 315, in response to the "no" in step 213, the real-time system RS1 compares the ANI (automatic number identification) of the caller's number with a list of ANIs which this subscriber has previously listed as a suspected source of fraudulent calls. If there is no match, the real-time system RS1 connects the call in step 320; if there is a match, it goes to step 324 to check whether the call matches a specified day of the week, such as a weekend day or a holiday, which this subscriber has previously listed as a suspected day of fraudulent calls. If there is no match, the real-time system RS1 connects the call in step 327; if there is a match, it goes to step 330 and checks for a match of the time of day, such as non-business hours, which this subscriber has previously listed as a suspected time of fraudulent calls.

With no match the real-time system RS1 connects the call in step 334; with a match, it has reached the point of finding that this is a suspicious call. In step 337, the real-time system RS1 determines whether to authenticate this call. It does this by interrogating its data to determine if a value of P has been set and if this is the 1/P-th suspicious call for this subscriber. If this is the 1/P-th suspicious call, the real-time system RS1 asks for the caller's PIN (personal identification number), or other form of identification on the basis of previously stored information, in step 340. The authentication may be by voice contact and may involve previously stored information such as the caller's mother's name. If there is a match, the call connects in step 347; if not the real-time system RS1 rejects the call in step 344.

Figure 4:
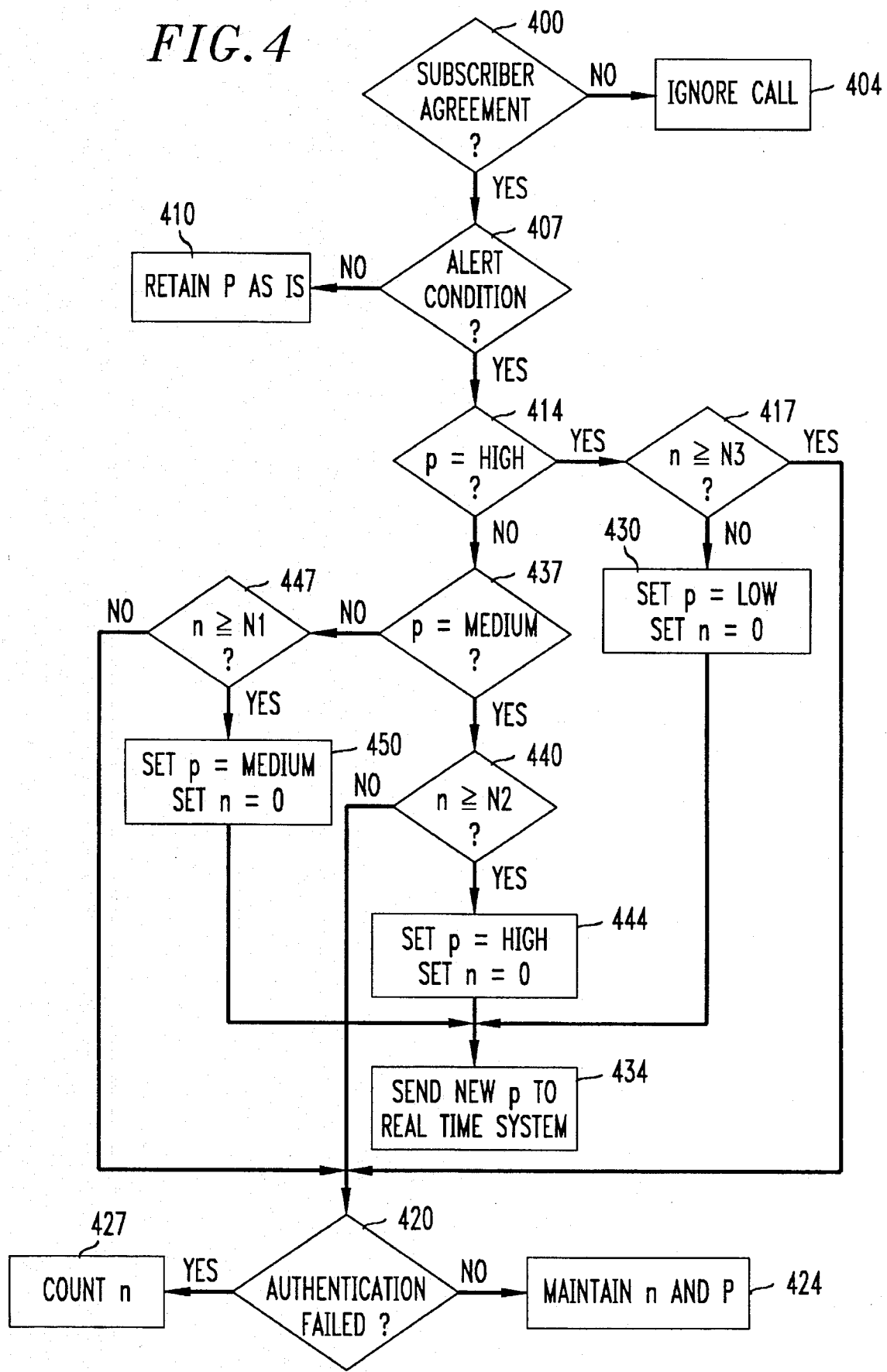
FIG. 4 is a flow chart illustrating the manner of adapting the operation of the system to vary the rates of authentication demands according to features of the invention.

FIG. 4 illustrates the manner in which the control system CS1 informs the real-time system RS1 of the existence of a subscriber agreement and adapts the value of P to the rate of suspicious calls. The control system CS1 operates in parallel with and independently of the real-time system RS1.

In step 400, the control system CS1 determines from its data base whether the subscriber SU calling is one who has agreed to the adaptive monitoring authentication arrangement according to the invention. In this arrangement, the subscriber agrees to various levels, i.e. frequencies, of authentication demands, involving service interruption, depending on the number of suspicious calls received. FIG. 4 illustrates three preset levels of authentication demands. The levels vary with the subscribers needs.

If the answer to step 400 is no, the control system CS1 goes to step 404 for ordinary processing as shown in FIGS. 2 and 3 and otherwise ignores the call. If the answer is yes, the control system CS1 advances to step 407 to determine if there is an alert condition, that is, a condition that may require a change in the value of P. The control system CS1 ascertains the existence of the alert condition in the alert logic shown in FIG. 5.

If in step 407, the alert logic of FIG. 5 indicates no alert condition, the control system CS1 proceeds to step 410 and ignores the call. The value of P remains at the instantaneous existing value.

If in step 407 the alert logic of FIG. 5 indicates an alert condition, the control system CS1 proceeds with adaptive authentication logic by proceeding to step 414 for retaining or resetting the present value of P. The control system CS1 includes a data base that stores the adaptive authentication logic with the existing value of P and the low, medium, and high values of P for each subscriber SU with an agreement. In this arrangement, on the basis of the agreement with the particular customer, the real-time system RS1 authenticates a predetermined fraction P of all suspicious calls being charged to the customer SU. As an example the fraction of suspicious calls that the control system CS1 authenticates is 0.0001, namely 1 call in every 10,000. In the example of FIG. 4, The subscribers decide on three values of P, low, medium and high, all between 0 and 1.0, on the basis of their agreement with the telecommunications provider.

In step 414, the control system CS1 checks whether the existing value of P is high. If yes, it proceeds to step 417 to determine if the rate of failed authentications, that is the number n of failed authentications in a previous period is equal to or exceeds a preset value N3. The subscriber SU, by previous agreement, has determined the value of N3 on the basis of the number of unauthorized calls the subscriber is willing to accept without intervention. If the answer is yes, the control system leaves the high value of P and proceeds to step 420. The real-time system RS1 now authenticates the call, if it is the 1/P-th call. In step 420, the control system CS1 checks whether the authentication has failed. If not, in step 424, it maintains n and P. If yes, it increments the value of n.

If n is less than N3, the control system CS1, in step 430, sets P to the low value and resets n to 0. In step 434 the control system CS1 sends the new value of P to the real-time system RS1.

If P is not high in step 414, the control system CS1, in step 437, checks if P is the medium value selected by the subscriber SU. If the answer is yes, the control system CS1 checks whether n is greater or equal to N2 in step 440; if yes it sets P high and n to 0 in step 444. It also sends the new value of P to the real-time system in step 434. If step 440 is no, the control system CS1 proceeds to step 420 and again checks whether the authentication has failed.

If P is not medium in step 437, it is by implication low, and the control system CS1, in step 447 determines if n is greater of equal to the value N1 preset on the basis of the subscriber's request. If yes the control system CS1, in step 450, sets the value P to medium and n to 0; it then sends the new value of P to the real-time system RS1 in step 434. The real-time system utilizes the new value of P for subsequent calls of that subscriber SU.

The alert logic in FIG. 5 follows the logic in FIGS. 2 and 3. However, it may omit or add conditions. For example, in FIG. 5, the subscriber has previously determined that only domestic calls require consideration as suspect for purposes of interruption. Thus the control system CS1 ignores the subscriber's international calls. In step 501 of FIG. 5, the control system CS1 determines whether the caller's account and authorization codes are valid for the particular subscriber. These codes may be a combination of a telephone credit card or a station number or a cellular phone code, etc., and a customer identification number. If these codes are invalid, the control system CS1 ignores the call in step 503 because the real time system would reject the call in any case.

If these are valid, the control system CS1 proceeds to step 502 to determine if this is an international call. If yes, in step 504 the control system CS1 ignores the call because the subscriber has previously indicated that only domestic calls require interruption and authentication here.

If step 502 indicates that this is not an international call, the control system CS1 goes to step 505 and determines whether the caller is in a specifically permitted screening group. If yes, the control system CS1 goes to step 512 which ignores the call because the real time system has determined to connect this call. If the caller is not in the specifically permitted screening group, the process goes to step 513 to determine if the caller is in a specifically forbidden screening group. If yes, the control system CS1 goes to step 514 and ignores the call. If not the process continues in step 515. Here, the control system CS1 compares the ANI (automatic number identification) of the caller's number with a list of ANIs which this subscriber has previously listed as a suspected source of fraudulent calls. If there is no match, the control system CS1 ignores the call in step 520; if there is a match, it goes to step 524 to check whether the call matches a specified day of the week, such as a weekend day or a holiday, which this subscriber has previously listed as a suspected day of fraudulent calls. If there is no match, the control system CS1 ignores the call in step 527; if there is a match, in step 530 it checks for a match of the time of day, such as non-business hours, which this subscriber has previously listed as a suspected time of fraudulent calls.

With no match the control system CS1 ignores the call in step 534; with a match, it has reached the point of finding that this is an alert state and indicates such in step 407 of FIG. 4.

These conditions for monitoring and authenticating calls are established by the subscriber and may be any one or combination of a number of conditions such as the following. Is this call from a source that has not hitherto been authorized to make an international call? Is the destination a previously unauthorized destination? Is the call being made at a previously unauthorized time of day? Is the call being made on a weekend and previously authorized only for weekdays? Is this call a domestic call when only international calls have been authorized? Is this call a data call when only voice has been authorized? Is this a voice call when only data calls have been authorized? Have prior questionable calls been made from this source? Have prior questionable calls been made to this destination?

It will be evident that the monitoring and authentication processes, and particularly the process for determining whether the call is suspicious, need not be limited to the examples in FIGS. 2 and 3. They may be any number of combined or individual conditions that make the subscriber initiate the monitoring and authentication process. For example the processes defined in the copending application of B. E. McNair may be used. The aforementioned copending application of B. E. McNair, Ser. No. 07/891,347, filed May 29, 1992, discloses an access control system that permits "soft" access control decisions to be made as to whether a user is eligible to gain access to a resource. It utilizes data obtained from transactions involving both valid and fraudulent users and clusters them in multi-dimensional attribute space, with each of the clusters representing an attribute profile of similar user behaviors. It evaluates the attributes of an access attempt and the attribute profiles represented by the clusters to identify fraudulent users on the basis of probabilities of eligibility for access.

It characterizes a particular access request as most likely valid or most likely fraudulent and depends upon the history of previous access attempts by particular users to be stored. The McNair application is hereby made a part of this application as if recited herein.

The invention adapts the monitoring and interruptions to particular predetermined conditions. The value of P can be set to any value form from 0 to 1.0, such as 0.25, 0.95, 0.00001, and 1.0. The latter interrupts all calls. The values of N1, N2, and N3 are determined by the subscriber customer who decides how many fraudulent calls it will accept in any time period before initiating a higher or lower level of authentication.

The embodiments shown represent only examples based on what a customer subscriber may desire. These embodiments may vary. For example, in other embodiments of FIGS. 2 and 3, any or all of the connect steps 208, 211, or 212 connect to step 315. In that case steps 508, 511, and 512 no longer ignore the call but connect to step 515 in FIG. 5.

The number of values of P and N need not be three but may be less or more as desired by the subscriber. The monitoring and interruption-authentication process need not be separated in the real-time system RS1 and control system CS1 as shown in FIG. 1, but according to an embodiment of the invention is accomplished in a single real-time system. The advantage of the separation between the two systems is that such allows faster operation of the real-time system.

Moreover, according to an embodiment of the invention, the logic may be far more general. The steps of FIG. 2 are but one step called "connect or reject on predetermined conditions" and the steps of FIG. 3 are replaced by steps entitled "are there suspected conditions that might require authentication?" and if not ignore; if yes then "is this the 1/P-th call?". If yes to that, "authenticate". In this embodiment, FIG. 5 has only steps asking "are there suspected conditions for alert?" If not ignore, if yes go to 407.

The aforementioned embodiments base the values of P and n on all failed authentications. According to another embodiment of the invention, the value of P is not be based on the number of failed authentications, but is an arbitrary value applied to all calls. In that case, the alert condition logic of FIG. 5 and the steps 315 to 330 of FIG. 3 become unnecessary, and step 334 determines authentication for every 1/P-th call. The value n is based on failed authentications. The alert condition exists for all calls. The control system CS1 varies the value of P on the basis of failed authentications of all calls.

While embodiments of the invention, have been described in detail, it will be evident to those skilled in the art that the invention may be embodied otherwise without departing from its spirit and scope.

What is claimed is:

1. The method of monitoring access to a system, comprising:

establishing a rate of interruption for demanding authentication from a potential accessor;

denying access in the event of failure to authenticate in response to each demand; and automatically varying the rate of interruption to a another rate in response to predetermined conditions;

one of the predetermined conditions including prior failed authentications.

2. The method as in claim 1, wherein the rate of interruption is varied on the basis of the rate of failed authentications.

3. The method as in claim 1, wherein a further one of the predetermined conditions is an alert condition related to time.

4. The method of monitoring access to a system, comprising:

establishing a rate of interruption for demanding authentication from a potential accessor;

denying access in the event of failure to authenticate in response to each demand; and automatically varying the rate of interruption to a another rate in response to predetermined conditions;

the step of establishing a rate of interruption including determining whether calls are suspicious and determining the rate of interruptions on the basis of only the rate of failed suspicious calls.

5. The method as in claim 4, wherein automatically varying the rate of interruption to a another rate includes determining the rate of failed authentication demands and adjusting the rate of interruption on the basis of the rate of failed authentication demands.

6. The method as in claim 1, wherein the established rate of interruption is P, where P is equal to any value of from 0 to 1.0 and each 1/P-th call is interrupted.

7. The method as in claim 1, wherein the step of varying the rate of interruptions includes raising the rate of interruptions if the number of authentication failures exceeds a given number over a period of time, and decreasing the rate of interruptions if the number of authentication failures is less than a given amount over a period of time.

8. The method as in claim 1, wherein predetermined conditions include an alert condition related to time and the number of failed authentications.

9. The method as in claim 1, wherein the step of varying the rate of interruptions includes setting three default rates, and varying between the three rates on the basis of the rate of failed authentications.

10. An apparatus for monitoring access to a system, comprising:

means for establishing a rate of interruption for demanding authentication from a potential accessor;

means for denying access in the event of failure to authenticate in response to each demand; and means for varying the rate of interruption to another in response to predetermined conditions selected by the customer, one of the predetermined conditions including prior failed authentications.

11. An apparatus as in claim 10, wherein the means for varying the rate of interruption includes means for varying on the basis of the rate of failed authentications.

12. An apparatus as in claim 10, wherein one to the predetermined conditions is an alert condition related to time.

13. An apparatus for monitoring access to a system, comprising:

means for establishing a rate of interruption for demanding authentication from a potential accessor;

means for denying access in the event of failure to authenticate in response to each demand; and means for varying the rate of interruption to another in response to predetermined conditions selected by the customer, the means for establishing a rate of interruption including means for determining whether calls are suspicious and means for determining the rate of interruptions on the basis of only the rate of failed suspicious calls.

14. An apparatus as in claim 13, wherein the means for automatically varying the rate of interruption to a another rate includes means for determining the rate of failed authentication demands and means for adjusting the rate of interruption on the basis of the rate of failed authentication demands.

15. An apparatus as in claim 10, wherein the established rate of interruption is P, where P is equal to any value of from 0 to 1.0 and each 1/P-th call is interrupted.

16. An apparatus as in claim 10, wherein the means for varying the rate of interruptions includes means for raising the rate of interruptions if the number of authentication failures exceeds a given number over a period of time, and decreasing the rate of interruptions if the number of authentication failures is less than a given amount over a period of time.

17. An apparatus as in claim 10, wherein further predetermined conditions include an alert condition related to time and the number of failed authentications.

18. An apparatus as in claim 10, wherein the means for varying the rate of interruptions includes means for setting three default rates, and means for varying between the three rates on the basis of the rate of failed authentications.

19. The method as in claim 1, wherein the step of establishing a rate of interruption includes determining whether calls are suspicious and determining the rate of interruptions on the basis of the rate of failed suspicious calls.

20. The method as in claim 19, wherein automatically varying the rate of interruption to a another rate includes determining the rate of failed authentication demands and adjusting the rate of interruption on the basis of the rate of failed authentication demands.

21. An apparatus as in claim 10, wherein the means for establishing a rate of interruption includes means for determining whether calls are suspicious and means for varying the rate of interruptions on the basis of the rate of failed suspicious calls.

22. An apparatus as in claim 21, wherein the means for automatically varying the rate of interruption to another rate includes means for determining the rate of failed authentication demands and means for adjusting the rate of interruption on the basis of the rate of failed authentication demands.

* * * * *